United States Patent

[11] 3,564,259

[72] Inventors Walter Hennig;
 Lothar Brust; Erich Geissler, Dresden,
 Germany
[21] Appl. No. 732,391
[22] Filed May 27, 1968
[45] Patented Feb. 16, 1971
[73] Assignee VEB Pentacon Dresden Kamera-
 undKinowerke
 Dresden, Germany

[54] PHOTOELECTRIC EXPOSURE METER WITH OFF-ZERO BALANCING MARK ON METER SCALE
 5 Claims, 4 Drawing Figs.
[52] U.S. Cl. ................................................ 250/210,
 324/62, 324/115
[51] Int. Cl. ...................................................... H01j 39/12
[50] Field of Search ......................................... 200/167,
 156, 210; 324/115, 156, 62 (B), 65 (B)

[56] References Cited
UNITED STATES PATENTS

| | | | |
|---|---|---|---|
| 3,217,129 | 11/1965 | Hufnagel ..................... | 200/167 |
| 3,225,170 | 12/1965 | Chabaca et al. ............... | 200/167 |
| 3,227,831 | 1/1966 | Jacks et al. ................... | 200/167 |
| 3,284,709 | 11/1966 | DePaolo ....................... | 324/115 |

Primary Examiner—William F. Lindquist
Assistant Examiner—Martin Abramson
Attorney—Young & Thompson ABSTRACT: A photoelectric exposure-measuring device having a photoconductive cell arranged in a compensation circuit and an optical or electric balancing resistance and a galvanometer indicating the state of balance, the return spring of which seeks to rotate the moving coil into the currentless zero position, wherein an off zero indication mark is provided on the galvanometer to which mark the galvanometer is set to provide an indication of correct exposure factors for prevailing light conditions.

INVENTORS
WALTER HENNIG
LOTHAR BRUST
ERICH GEISSLER
By Young + Thompson
ATTYS.

PHOTOELECTRIC EXPOSURE METER WITH OFF-ZERO BALANCING MARK ON METER SCALE

BACKGROUND OF THE INVENTION

The invention relates to a photoelectric exposure-measuring device having a photoconductive cell arranged in a compensation circuit and an optical or electrical balancing resistance, also a galvanometer indicating the state of balance, the return spring of which seeks to return the moving coil into the currentless zero position.

Known exposure-measuring devices of this kind possess galvanometers or glow lamps arranged for example in the diagonal branch of a Wheatstone bridge, and in these systems the fact that a correct setting for prevailing light conditions has been effected, is indicated by setting the current in the diagonal branch of the bridge to zero by means of the balancing resistor so that the meter pointer swings on to the zero mark or the glow lamp is extinguished. In these arrangements the measurement position of the meter pointer which indicates the correct setting of the exposure factors corresponds to the zero position of the meter pointer. This ambiguity of the indication can lead to incorrect exposures as the meter pointer standing in the zero position as a result of switching off of the battery may be regarded as an indication that the exposure factors have been correctly set in accordance with prevailing light conditions.

To enable the currentless zero position to be distinguished from the measuring position of the meter pointer in accordance with the brightness, it has already been proposed that a warning signal, by which the nonoperative or operative state of the exposure measuring device, as the case may be, is indicated in the observation window for the meter pointer, should be operatively connected with the operating switch of the said exposure measuring device. A warning device of this kind necessitates additional components which involve extra expense in the construction of the exposure measuring device. The purpose of the invention is to provide a compensation circuit with a simplified means of indicating whether exposure measuring devices are in the inoperative or operative state.

SUMMARY OF THE INVENTION

According to the invention, this object is achieved by a system in which a setting mark indicating that the exposure factors (diaphragm, exposure time etc.) which can be selected with the balancing resistance have been adjusted correctly in accordance with prevailing light conditions is provided at a certain distance from the zero mark by which the zero position of the meter pointer connected with the moving coil is indicated in the known manner. In an expedient version of the invention the zero position of the meter pointer is covered over by a plate. The measure provided by the invention can also be adopted in connection with a moving coil instrument with two windings taking opposite directions.

DESCRIPTION OF PREFERRED EMBODIMENT

Figure 1:
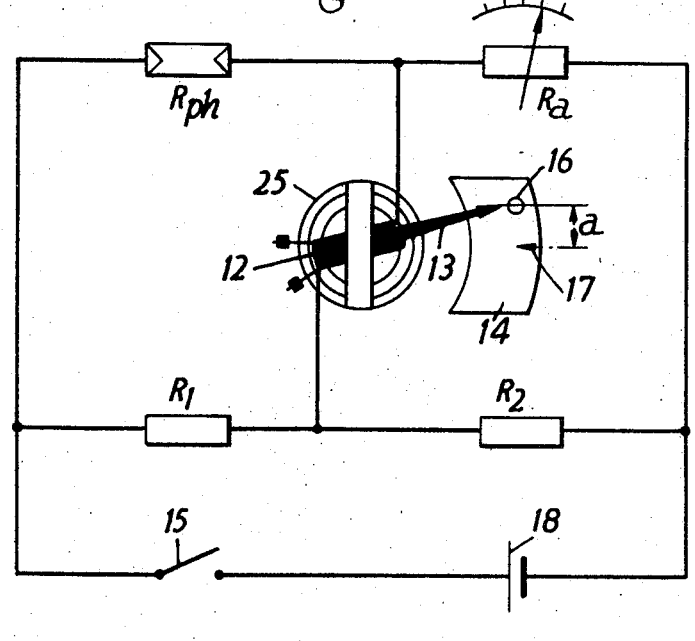
FIG. 1 shows an indicator device formed with Wheatstone bridge, electric balancing resistance and deflection difference, in the rest position.

FIG. 1 shows a galvanometer 25 arranged in the diagonal branch of a Wheatstone bridge with fixed resistances $R_1$ and $R_2$, balancing resistance $R_a$ and photoconductive cell $R_{ph}$. A meter pointer 13 connected with a moving coil 12 is visible in an observation window 14. In the observation window 14 the zero position which the meter pointer 13 assumes when the operating switch 15 has been opened is indicated by the zero mark 16. At the visible distance $a$ from the zero mark 16 is the setting mark 17 which the meter pointer 13 reaches when a diagonal current corresponding to the deflection $a$ passes through the moving coil 12.

Figure 2:
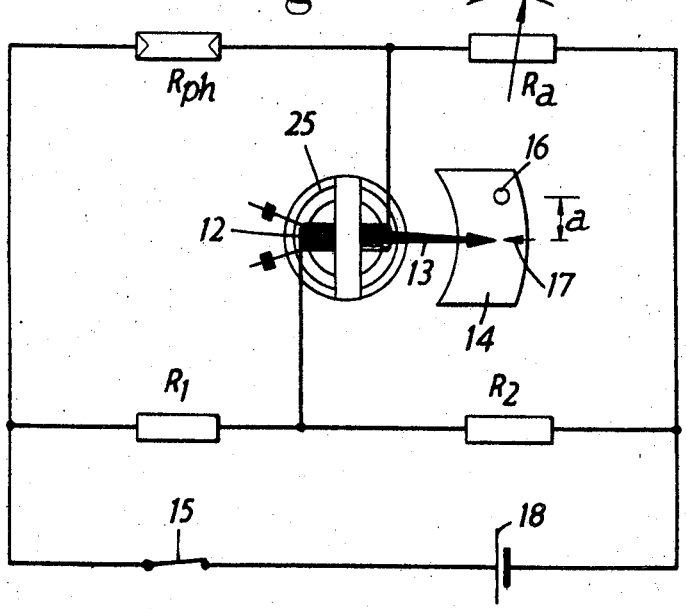
FIG. 2 shows the arrangement according to FIG. 1 in the measuring position.

The manner of operation of this arrangement is as follows:

When the operating switch 15 is opened (see FIG. 1) the battery 18 is switched off so that the moving coil 12 is situated in the zero position as a result of its return spring. The meter pointer 13 connected with the moving coil 12 points to the zero mark 16. Switching on of the exposure-measuring device is effected by closing of the operating switch 15 (see FIG. 2), so that the moving coil 12 is energized and deflects against its return spring. In order to effect a correct setting in accordance with prevailing light conditions, the balancing resistance $R_a$ is varied until the meter pointer 13 stands opposite to the setting mark 17. The fact that the correct setting has been effected in accordance with the brightness conditions can be clearly distinguished from the inoperative position of the exposure measuring device by means of the setting mark 17 situated at a distance $a$ from the zero position.

Figure 3:
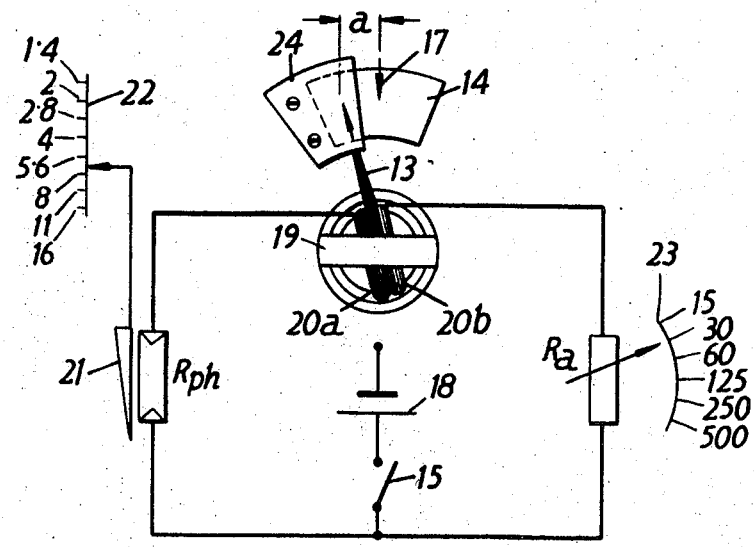
FIG. 3 shows an exposure-measuring device with cross-coil instrument, optical and electric balancing resistance and additional covering plate for the zero position, in the inoperative rest position.
Figure 4:
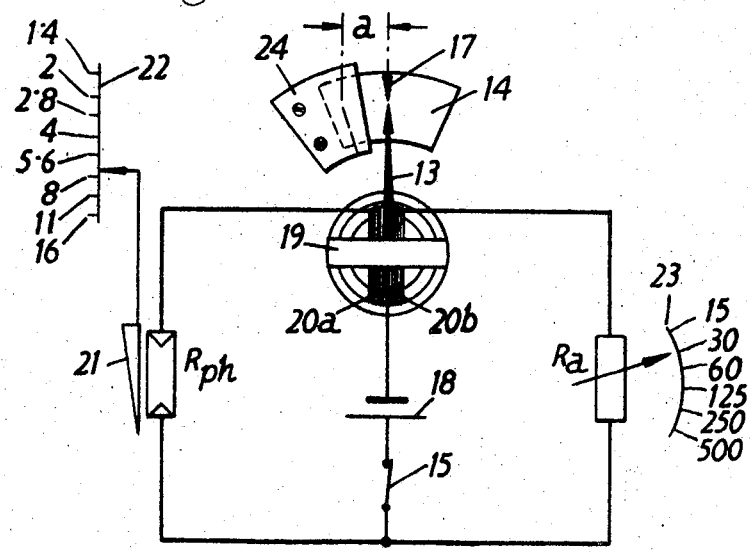
FIG. 4 shows the device according to FIG. 3 in the measuring position.

In another form of embodiment (see FIGS. 3 and 4) the galvanometer 19 is equipped with a moving coil 20 which possesses two contrary windings 20b and 20a. The one winding 20a is in series with the photoelectric cell $R_{ph}$ and the other winding 20b is in series with the electric balancing resistance $R_a$ to the battery 18. The operating switch 15 enables the exposure-measuring device to be switched on. A gray wedge 21 is arranged as optical balancing resistance and is provided in front of the photoelectric cell $R_{ph}$. The gray wedge 21 is settable according to a diaphragm scale 22 and the electric balancing resistance $R_a$ is settable according to an exposure time scale 23. The meter pointer 13 connected with the moving coil 20 is visible in the observation window 14, which is covered by a plate 24 in the region of the zero position of the meter pointer 13. The setting mark 17 is provided at the distance $a$ from the zero position of the meter pointer 13.

The manner of operation of this arrangement is as follows:

When the operating switch 15 is opened (see FIG. 3) the battery 18 is switched off so that the moving coil 20 is situated in the zero position covered by the plate 24, as a result of its return spring. The meter pointer 13 connected with the moving coil is thus also covered by the plate 24 and therefore not visible in the observation window 14. The exposure-measuring device is switched on by closing of the switch 15 (see FIG. 4). Current then passes through the moving coil windings 20a and 20b in opposite directions, so that the moving coil 20 performs a deflection in opposition to the force of its return spring. To effect the correct setting in accordance with prevailing light conditions the electric balancing resistance $R_a$ or the optical balancing resistance in the form of the gray wedge 21 are varied until the meter pointer 13 is situated opposite to the setting mark 17. As the setting mark 17 is arranged at the distance $a$ from the zero position a correct setting in accordance with prevailing light conditions can be distinguished clearly from the inoperative position of the exposure-measuring device.

We claim:

1. In a photoelectric exposure measuring device having a photoconductive cell and an optical or electrical balancing resistance arranged in a compensation circuit and a galvanometer connected to the compensation circuit to indicate the state of balance of the circuit having a moving coil and a return spring which urges the moving coil towards a currentless zero position, the provision of an off-zero exposure factor correct indication mark on the galvanometer whereby when a current source is connected to the compensation circuit and the galvanometer is set to the mark, the measuring device provides a correct exposure factor indication in accordance with prevailing light conditions.

2. A photoelectric exposure measuring device according to claim 1 wherein the compensation circuit is a Wheatstone bridge and the photoconductive cell is connected in one branch, the balancing resistance is connected in the other branch and the galvanometer is connected in a diagonal branch.

3. In a photoelectric exposure measuring device according to claim 1 the provision of a plate covering the zero position of the galvanometer.

4. A photoelectric exposure-measuring device according to claim 1, wherein the moving coil of the galvanometer comprises two contrary windings, of which one is connected with a photoconductive cell and the other with a balancing resistance in each case in series to the current source.

5. In a photoelectric exposure measuring device according to claim 4, the provision of a gray wedge operatively connected to a diaphragm aperture setting device and adapted to vary light incident on the photoconductive cell in accordance with the diaphragm aperture setting.